US006986367B2

(12) United States Patent
Toas et al.

(10) Patent No.: US 6,986,367 B2
(45) Date of Patent: Jan. 17, 2006

(54) FACED MINERAL FIBER INSULATION BOARD WITH INTEGRAL GLASS FABRIC LAYER

(75) Inventors: Murray S. Toas, Norristown, PA (US); Walter Steve Leeper, Jr., Acworth, GA (US); Steve Archibald, Philadelphia, PA (US); John Ward, Duluth, GA (US)

(73) Assignee: CertainTeed Corporation, Valley Forge, PA (US)

( * ) Notice: Subject to any disclaimer, the term of this patent is extended or adjusted under 35 U.S.C. 154(b) by 166 days.

(21) Appl. No.: 10/719,172

(22) Filed: Nov. 20, 2003

(65) Prior Publication Data

US 2005/0112966 A1 May 26, 2005

(51) Int. Cl.
*F16L 9/14* (2006.01)

(52) U.S. Cl. .......................... 138/153; 442/2; 442/20; 442/24; 442/26; 442/27; 442/32; 442/35; 442/38; 442/43; 442/47; 442/149; 442/150; 442/151; 442/168; 442/180; 442/45; 156/305; 156/308.2; 156/327; 138/141; 138/143; 138/145; 138/146; 138/149; 138/174

(58) Field of Classification Search .............. 442/2, 442/20, 24, 26, 27, 32, 35, 38, 43, 45, 47, 442/149, 150, 151, 168, 180; 156/305, 308.2, 156/327; 138/141, 143, 145, 146, 149, 153, 138/174
See application file for complete search history.

(56) References Cited

U.S. PATENT DOCUMENTS

| 2,341,130 A | 2/1944 | Unsworth |
| 2,428,591 A | 10/1947 | Slayter |
| 2,467,291 A | 4/1949 | Brelsford et al. |
| 2,619,151 A | 11/1952 | Sheidley |
| 2,647,857 A | 8/1953 | Horne |
| 2,695,855 A | 11/1954 | Stephens |
| 2,768,026 A | 10/1956 | Stephens et al. |
| 2,790,464 A | 4/1957 | Stephens et al. |
| 2,825,389 A | 3/1958 | Stephens |
| 2,881,110 A | 4/1959 | Walker et al. |
| 2,938,737 A | 5/1960 | Walker et al. |
| 3,002,857 A | 10/1961 | Stalego |
| 3,025,197 A | 3/1962 | Sheidley |
| 3,092,529 A | 6/1963 | Pearson |
| 3,093,037 A | 6/1963 | Ward, Jr. |
| 3,113,788 A | 12/1963 | Johnston |

(Continued)

FOREIGN PATENT DOCUMENTS

EP        0763690 A2    3/1997

(Continued)

OTHER PUBLICATIONS

Johns Manville, "Microlith®-Glass Fiber Nonwoven", Type 10/3, Nov. 2003.

(Continued)

*Primary Examiner*—Terrel Morris
*Assistant Examiner*—Andrew T. Piziali
(74) *Attorney, Agent, or Firm*—Duane Morris LLP

(57) ABSTRACT

A method of insulating ducts is described including laminating a reinforcement fabric to a fibrous insulation board, lifting at least a portion of the reinforcement fabric from the fibrous insulation board, applying a first layer of a mastic coating to the fibrous insulation board, embedding the reinforcement fabric into the first layer of mastic coating, and applying a second layer of the mastic coating to the outside surface of the reinforcement fabric. The reinforcement fabric is laminated to the fibrous insulation board using an adhesive material.

21 Claims, 3 Drawing Sheets

U.S. PATENT DOCUMENTS

| | | |
|---|---|---|
| 3,212,529 A | 10/1965 | Ullman et al. |
| 3,242,527 A | 3/1966 | Rosenberg |
| 3,265,530 A | 8/1966 | Marzocchi et al. |
| 3,394,737 A | 7/1968 | Hoffmann et al. |
| 3,396,070 A | 8/1968 | Gambill et al. |
| 3,420,142 A | 1/1969 | Gale et al. |
| 3,492,771 A | 2/1970 | Jones et al. |
| 3,507,730 A | 4/1970 | Gambill et al. |
| 3,549,473 A | 12/1970 | Le Blanc et al. |
| 3,557,840 A | 1/1971 | Maybee |
| 3,605,534 A | 9/1971 | Barr |
| 3,615,969 A | 10/1971 | Hegg |
| 3,616,181 A | 10/1971 | Stalego |
| 3,642,554 A | 2/1972 | Hensley |
| 3,642,560 A | 2/1972 | Marsh, Jr. et al. |
| 3,755,029 A * | 8/1973 | Ellis et al. ............... 156/71 |
| 3,768,523 A | 10/1973 | Schroeder |
| 3,861,425 A | 1/1975 | Clark |
| 3,867,221 A | 2/1975 | Chant |
| 3,885,593 A | 5/1975 | Koerber et al. |
| 3,915,783 A | 10/1975 | Goppel et al. |
| 3,942,774 A | 3/1976 | Sokolow |
| 3,945,962 A | 3/1976 | Clark |
| 3,980,511 A | 9/1976 | Proucelle |
| 3,996,824 A | 12/1976 | Cailey |
| 4,002,367 A | 1/1977 | Thomas |
| 4,005,234 A | 1/1977 | Stroupe |
| 4,067,678 A | 1/1978 | Beranek, Jr. et al. |
| 4,070,954 A | 1/1978 | Cailey |
| 4,101,700 A | 7/1978 | Ray, Jr. et al. |
| 4,175,159 A | 11/1979 | Raleigh |
| 4,179,808 A | 12/1979 | Smith |
| 4,183,379 A | 1/1980 | Marquette et al. |
| 4,196,755 A | 4/1980 | Kutnyak et al. |
| 4,226,662 A | 10/1980 | McCort |
| 4,243,075 A | 1/1981 | McPherson et al. |
| 4,304,267 A | 12/1981 | Campbell, Jr. |
| 4,310,585 A | 1/1982 | Shannon |
| 4,389,587 A | 6/1983 | Levine et al. |
| 4,456,637 A | 6/1984 | Takeda et al. |
| 4,528,053 A | 7/1985 | Auer |
| 4,573,715 A | 3/1986 | Armbruster |
| 4,621,013 A | 11/1986 | Holtrop et al. |
| 4,680,070 A | 7/1987 | Hughes |
| 4,709,523 A | 12/1987 | Broderick et al. |
| 4,758,395 A | 7/1988 | Zion |
| 4,824,714 A | 4/1989 | Gest |
| 4,839,222 A | 6/1989 | Jain |
| 4,887,663 A | 12/1989 | Auxier et al. |
| 4,895,745 A | 1/1990 | Vesley et al. |
| 4,909,282 A | 3/1990 | Staugaard |
| 4,968,556 A | 11/1990 | Jain |
| 4,983,081 A | 1/1991 | Cunningham, Jr. |
| 4,990,370 A | 2/1991 | Terry et al. |
| 5,008,131 A | 4/1991 | Bakhshi |
| 5,009,932 A | 4/1991 | Klett et al. |
| 5,020,481 A | 6/1991 | Nelson |
| 5,025,052 A | 6/1991 | Crater et al. |
| 5,144,795 A | 9/1992 | Field |
| 5,169,700 A | 12/1992 | Meier et al. |
| 5,186,704 A | 2/1993 | Cunningham, Jr. |
| 5,300,592 A | 4/1994 | Kanagawa et al. |
| 5,310,594 A | 5/1994 | Holland et al. |
| 5,314,719 A | 5/1994 | Batdorf et al. |
| 5,370,919 A | 12/1994 | Fieuws et al. |
| 5,371,989 A | 12/1994 | Lehnert et al. |
| 5,379,806 A | 1/1995 | Matthews et al. |
| 5,385,610 A | 1/1995 | Deerer et al. |
| 5,391,840 A | 2/1995 | Hughes et al. |
| 5,397,631 A | 3/1995 | Green et al. |
| 5,421,938 A | 6/1995 | Cunningham, Jr. |
| 5,460,206 A | 10/1995 | Sansoucy |
| 5,487,412 A | 1/1996 | Matthews et al. |
| 5,528,904 A | 6/1996 | Jones et al. |
| 5,534,298 A | 7/1996 | Cross et al. |
| 5,549,942 A | 8/1996 | Watts |
| 5,567,504 A | 10/1996 | Schakel et al. |
| 5,578,258 A | 11/1996 | Grant et al. |
| 5,607,529 A * | 3/1997 | Adamczyk et al. ......... 156/143 |
| 5,612,405 A | 3/1997 | Bainbridge et al. |
| 5,624,471 A | 4/1997 | Gaeta et al. |
| 5,625,999 A | 5/1997 | Buzza et al. |
| 5,712,012 A | 1/1998 | Forman et al. |
| 5,750,225 A | 5/1998 | Petty |
| 5,762,109 A | 6/1998 | Matthews et al. |
| 5,765,586 A | 6/1998 | Facas et al. |
| 5,776,841 A | 7/1998 | Bondoc et al. |
| 5,783,268 A | 7/1998 | Noonan et al. |
| 5,783,623 A | 7/1998 | Skoufis et al. |
| 5,836,357 A | 11/1998 | Kittson et al. |
| 5,953,818 A | 9/1999 | Matthews et al. |
| 5,958,137 A | 9/1999 | Caldwell et al. |
| 5,985,429 A | 11/1999 | Plummer et al. |
| 6,000,437 A | 12/1999 | Ponder et al. |
| 6,148,867 A | 11/2000 | Matthews et al. |
| 6,207,245 B1 | 3/2001 | Miller et al. |
| 6,213,522 B1 | 4/2001 | Jacobson et al. |
| 6,231,927 B1 | 5/2001 | Ruid |
| 6,270,865 B1 | 8/2001 | Noonan et al. |
| 6,331,350 B1 | 12/2001 | Taylor et al. |
| 6,451,432 B1 | 9/2002 | Azzopardi et al. |
| 6,457,237 B1 | 10/2002 | Matthews et al. |
| 6,555,951 B2 | 4/2003 | Jeoung |
| 6,769,455 B2 | 8/2004 | Toas et al. |
| 2001/0033782 A1 | 10/2001 | Conley |
| 2001/0033926 A1 | 10/2001 | Matthews et al. |
| 2002/0127399 A1 | 9/2002 | Mankell et al. |
| 2002/0146521 A1 | 10/2002 | Toas et al. |
| 2003/0008092 A1 | 1/2003 | Toas et al. |
| 2003/0032351 A1 | 2/2003 | Horner, Jr. et al. |
| 2003/0056229 A1 | 3/2003 | Crabtree et al. |
| 2003/0068943 A1 | 4/2003 | Fay |
| 2003/0236043 A1 | 12/2003 | Calzavara et al. |
| 2004/0038608 A1 | 2/2004 | Shaw et al. |
| 2004/0118472 A1 | 6/2004 | Mota et al. |
| 2004/0137181 A1 | 7/2004 | Ruid et al. |
| 2005/0031819 A1 | 2/2005 | Mankell et al. |

FOREIGN PATENT DOCUMENTS

| | | |
|---|---|---|
| ES | 9402661 | 12/1994 |
| FR | 1137652 | 6/1957 |
| WO | WO 99/00338 | 1/1999 |

OTHER PUBLICATIONS

Johns Manville, "Microlith®-Glass Fiber Nonwoven", Type 10/4, Dec. 2003.

North American Insulation Manufacturers Association, "Fibrous Glass Commercial Insulation Boards", Insulation Facts #67, www.naima.org, no date.

North American Insulation Manufacturers Association, "Fibrous Glass Duct Wrap", Insulation Facts #66, www.naima.org, no date.

CertainTeed Corporation, CertainTeed Building Solutions, "Product Information," CertainTeed Duct Insulation, no date.

CertainTeed Corporation, "List Prices—ToughGard™ Duct Board", Oct. 1, 1994, Valley Forge, Pennsylvania, USA.

CertainTeed Corporation, "Product Specification; PS 57.00", May 23, 1994.

CertainTeed Corporation, "Product Sheet—ToughGard™ Duct Board Fiber Glass Duct Board Systems", 1994, Valley Forge, Pennsylvania, USA, no month.
CertainTeed Corporation, "Raw Material Specification: Certa*Faced Ultra*Duct Mat Facing", Jun. 23, 1994.
CertainTeed Corporation, "Specification Sheet—ToughGard™Duct Board with Enhanced Surface", Jan. 2002.
CertainTeed Corporation, "Specification Sheet—ToughGard™Duct Liner with Enhanced Surface", 2001, no month.
CertainTeed Corporation, Spec. Sheet,—ToughGard™ Duct Board, 2 pages, Feb. 2002.
CertainTeed Corporation, "Specification Sheet—Ultra*Duct™ Gold", Mar. 2002.
CETIAT "Test Report" Jul. 24, 1991, 6 pages (including translation attached).
Climaver® 234, no date.
Climaver® 254, no date.
Climaver® 264, no date.
Climaver 284-234 "Construction and self-support air conditioning ducts", 18 pages (including translation attached), no date.
Climaver Plata—Specification of a Product—relevance on first page density 70 kg/m³ (no translation attached), no date.
Elasti-Glass® R3100B Series—Glass Fiber Mats, Schuller, 2 pages, May 1997.
France-Air, "Glass Fibre panels for air ducts" 21 pages (including translation attached), no date.
French Republic, National Testing Laboratory, Nov. 28, 1998, 18 pages (including translation attached).
Glasuld "Product Data-Industrial Sheet Black" Sheet: 172 p. 1, Nov. 1989, 1 page (14 pages, including translation of parts of the Danish ventilation attached).
Glasuld "Ventilations-Kanaler", no date.
Isover "Gama Climaver", no date.
Isover Gullfiber—translation of the relevant parts of the Swedish Product Catalogue for Technical Insulation Mar. 1989.
Isover "Price List" Jan. 1991, 51 pages (including translation attached).
Isover Saint-Gobain Roche & Verre-Insulation and Air Conditioning, Mar. 1990, 8 pages (including translation attached).
Johns-Manville, "Air Handling Systems—Linacoustic RC™ Fiber Glass Duct Liner with Reinforced Coating System," (preliminary product information), AHS-329 Feb. 2002.
Johns-Mansville, Air Handling Systems—SuperDuct™ Coated High Performance Air Duct Board, Type 475 & 800, AHS 200 Jun. 2000.
Johns-Mansville Fiber Glass, "Micro-Aire Duct Systems Fabrication Manual", USA.
Johns-Manville Manufacturing, "Finished Product Specification—Micro-Aire Duct Board Standard Heavy Duty Spec No. 4365-15", 1971-1973, USA, no month.
Johns-Mansville Manufacturing, "Product Specification—Micro-Aire Duct Board Standard Duty Heavy Duty Spec No. 4365-20", 1971-1973, USA, no month.
Knauf Air Duct Bd., Form No. AH-SS-2—Effective: Jan. 1998, 2.
Knauf Fiber Glass GmbH, "Submittal Sheet—Air Duct Board-M with Hydroshield Technology", Oct. 2000, USA.
Knauf Fiber Glass Insulation—Products, 7 pages, Feb. 2002.
Aircon, "Ventilation, Extraction and Air Conditioning—Installation Materials", Nov. 1991.
North American Insulation Manufacturers Association, "Fibrous Glass Duct Construction Standards", 2nd Edition, 1993, no month.
CertainTeed Corporation, "Certa*Faced Ultra*Duct Marketing Plan", Nov. 22, 1993.
Owens Corning, "Submittal Sheet—Aeromat Duct Liner", May 2001, USA.
Owens Corning, "Submittal Sheet—EnDura Coat Duct Board", May 2001, USA.
"Precision Coating Rods and Laboratory Products," Industry Tech, Oldsmar, FL, no date.
Roclaine Isover, "Recommended Prices Jan. 1993," Cristaleria Espanola S.A., Insulation Division, Jan. 1993, 3 pages (translation attached).
"Smooth Stainless Steel Rods, etc.", RD Specialites, Webster,NY, no date.
Testing Data from the Competitive Audit on Mar. 25, 1999, 3 pages.
Ulta Additives Catalog, DEE FO/AGITAN defoamers, reprinted Jan. 21, 2003 from http://www.ultraadditives.com.
Underwriters Laboratories Inc., "Report on Air Ducts", Jun. 8, 1992, Northbrook, Illinois, USA.
Underwriters Laboratories Inc., "Gas and Oil Equipment 1993", no month.
Underwriters Laboratories Inc., "Gas and Oil Equipment 1994", no month.
Underwriters Laboratories Inc., "Gas and Oil Equipment 1995", no month.
Underwriters Laboratories Inc., "Investigation of 'Climaver 284' Air Duct Board", Dec. 19, 1991, Northbrook, Illinois, USA.
Weiss, Herbert L., Coating and Laminating, Converting Tech. Co., Milwaukee, WI, pp. 7-9, 196-202, 1977, no month.
"Wire Wound Rod," Lembo-ITTI, http://www.lembo-itti.com/fx170005.htm Oct. 20, 1998.
CertainTeed—CertaPro™ (FiberGlass Insulation), Commercial Insulation, ©2003 CertainTeed Corporation, no month.
CertainTeed—Product—Certapro™ Commercial Board, http://www.certainteed.com/pro/insulation/html/Commercial/ins_com_combrd.htm, Aug. 21, 2003.
CertainTeed—Commercial Board Insulation, http://www.allinterior.com/showrooms/certainteed/scenery/commercialboardinsulation.htm, visited Aug. 21, 2003.
CertainTeed, Product Index "Commercial Insulation,"http://www.certainteed.com/CertainTeed/Undefined/Insulation/Prodindex/Commercial, May 25, 2004.
CertainTeed, "Product Index" Mechanical/HVAC Insulation, http://www.certainteed.com/CertainTeed/Undefined/Insulation/Prodindex/Mechanical, Jun. 21, 2004.
CertainTeed, "Product Index" Residential Insulation, http://www.certainteed.com/CertainTeed/Undefined/Insulation/Proindex/Residental, May 25, 2004.
CertainTeed, "CertainTeed Product Information," CertainTeed Building Solutions, not later than Dec. 30, 2002.
CertainTeed, Product Sheet—ToughGard™ Duct Board with Enhanced Surface, http://www.certainteed.com/pro/insulation/html AHprod/ins_mech_tgdb.html, Jul. 31, 2003.

CertainTeed Specification Sheet—Acousta Blanket™ Black Insulation, May 2003.
CertainTeed Specification Sheet—AcoustaBoard™ Black Insulation, May 2003.
CertainTeed Specification Sheet—CertaPro™ AcoustaBoard™ Black, Oct. 2002.
CertainTeed Specification Sheet—CertaPro™ AcoustaBlanket Black™, Oct. 2002.
CertainTeed Specification Sheet—CertaPro™ AcoustaTherm™ Batts, May 2001.
CertainTeed Specification Sheet—CertaPro™ Commercial Board, May 2001.
CertainTeed Specification Sheet—CertaPro™ Partition Batts, Jun. 2002.
CertainTeed Specification Sheet—CertaPro™ Thermal Extended Flange Batts, Oct. 2002.
CertainTeed Specification Sheet—CertaPro™ Thermal Foil Faced Batts, Oct. 2003.
CertainTeed Specification Sheet—CertaPro™ Thermal FSK-25 Faced Batts, Jun. 2003.
CertainTeed Specification Sheet—CertaPro™ Thermal Kraft Faced Batts, Oct. 2002.
CertainTeed Specification Sheet—Basement Wall and Masonry Wall Fiber Glass Building Insulation, Apr. 2004.
CertainTeed Specification Sheet—Commercial Blanket Insulation, Apr. 2000.
CertainTeed Specification Sheet CrimpWrap™ Crimped Pipe and Tank Wrap, Dec. 2002.
CertainTeed Specification Sheet, EZR™ Fiber Glass Building Insulation, Jan. 2004.
CertainTeed Specification Sheet, Fiber Glass Building Insulation, Apr. 2004.
CertainTeed Specification Sheet, FlameChek™ Duct Insulation, Apr. 2002.
CertainTeed Specification Sheet, FlameChek™ Plenum Insulation, Nov. 2002.
CertainTeed Specification Sheet, FlameChek™ Plus 2 Duct Insulation (Single Layer System), Apr. 2002.
CertainTeed Specification Sheet—Metal Building Insulation 202-96, Jun. 2003.
CertainTeed Specification Sheet—OEM Acoustical Board Insulation, Mar. 2002.
CertainTeed Specification Sheet—Preformed Pipe Insulation, Aug. 2003.
CertainTeed Specification Sheet, Soft Touch™ Duct Wrap Insulation, Aug. 2003.
CertainTeed Specification Sheet—Sound Attenuation Batts Acoustical Ceiling Batts NoiseReducer™ Batts, Nov. 2003.
CertainTeed Specification Sheet—SpeedyR™ Tabless Batts, Sep. 2003.
CertainTeed, "Specification Sheet—ToughGard™ Duct Board", Apr. 2002.
CertainTeed, Specification Sheet—ToughGard™ R Duct Liner with Enhanced Surface, Apr. 2002.
CertainTeed, Specification Sheet—ToughGard Rigid Liner Board with Enhanced Surface, Mar. 2002.
CertainTeed Corporation, Specification Sheet—Ultra*Duct™ Duct Board, Apr. 2001 or Mar. 2002.
CertainTeed Corporation, "Specification Sheet—Ultra*Duct™ Gold", Aug. 2003.
CertainTeed Specification Sheet—Ultralite© Duct Liner, Apr. 2003.
CertainTeed Specification Sheet—Universal Blanket, Aug. 2003.
CertainTeed ToughGard™ Duct Board, http://www.certainteed.com/cinsulate/cict00801p.html, Sep. 4, 2003.
CertainTeed, ToughGard™ Duct Board Fiber Glass Duct Board Systems, no date.
Fiber-Glass Duct Systems, http://www.tpub.com/steelworker2/27.htm, Aug. 14, 2003.
IBACOS, Fibrous Glass Duct Board White Paper, 2003, no month.
Isover Gullfiber—translation of the relevant parts of the Danish ventilation duct product "Industriplad Sort" and the corresponding Ventilation Duct Application brochure, no date.
Isover Roclaine, "Recommended Prices Jan. 1990," Cristaleria Espanola S.A., Insulation Division, Jan. 1993, 3 pages (translation attached).
Isover Roclaine, "Recommended Prices Jan. 1991," Cristaleria Espanola S.A., Insulation Division, Jan. 1993, 3 pages (translation attached).
Johns-Manville, "Super Duct™" Air Duct Board Fabrication Instructions, AHS-204, Feb. 1998.
Johns Manville, Fiber Glass Mat (Acrylic Binder), Material Safety Data, Sheet ID: 1014, Section 1—Chemical Product and Company Identification pp 1-6, Oct. 21, 2002.
Johns-Manville Manufacturing, "Finished Product Specification—Mat Faced Mad Board Spec No. 4365-15.6", 1971-1973, USA, no month.
Johns Manville, Glass Fiber Mats, Elasti-Glass© 3200B Series, 1 p., Oct. 30, 2002.
Knauf, Air Duct Board-M with Hydroshield™ Technology, Submittal Sheet, Form No. AH-SS-6, Oct. 2000.
Knauf Fiber Glass Insulation—Products, www.knauffiberglass.com/index.cfm?fuseaction=prd.dspProdDetail&ID=12, pp 1-7, Aug. 25, 2003.
Knauf Fiber Glass Insulation—Products, Knauf Air Duct Board-M www.Knauffiberglass.com/index.cfm?fuseaction=prd.dspProdDetail&ID=14, pp 1-7, visited Jan. 8, 2003.
Lydall, 23# Manniglas© 1803 WHB, Development Grade-Lot F2956, Data Sheet, 1 page, Nov. 20, 2002.
Lydall, 27# Manniglas© 1807, Development Grade-Lab Handsheets, Data Sheet, 1 page, Jan. 8, 2004.
Lydall, 40# Manniglas© 1786 Black, Development Grade-Lot F2933, Data Sheet, 1 page, Nov. 2002.
Lydall, 40# Manniglas© 1886 Black, Data Sheet, 1 page, Aug. 2002.
Lydall, 40# Manniglas© 1886 BX Black, Developmental Lot F2434, Data Sheet, 1 page, Dec. 2001.
Mid-rise and High-rise Exterior Building Envelope Board, Current System—Massachusetts "specifications", no date.
North American Insulation Manufacturers Association, "Fabrication Dimensions for 2" (R-8.7) Fibrous Glass Duct Board, Pub. No. AH-136, Aug. 2002.
North American Insulation Manufacturers Association, "Facts About Using Sealants in Fiber Glass Air Handling Systems", Insulation Facts #36, Pub. No. AH 125, Sep. 2000.

North American Insulation Manufacturers Association, "Fibrous Glass Duct System", Insulation Facts #64, Pub. No. AH 137, Jan. 2003.

RD Specialties, "Smooth Stainless Steel Rods, etc.", Webster, NY, no date.

ROXUL©—The Better Insulation™—RHT™605 Commercial Board—Design No. W605, RHT Industrial Board, http://199.202.236.133/canada/product_details.asp?id=82, visited Aug. 21, 2003.

ROXUL©—The Better Insulation™—Technical Product Information, Board Insulation 15080 RHT™605, ROXUL, Inc., Jun. 1, 2002.

ROXUL©—The Better Insulation™—Technical Product Information, Board Insulation 15080, RHT™606, ROXUL, Inc., Jun. 1, 2002.

* cited by examiner

FACED MINERAL FIBER INSULATION BOARD WITH INTEGRAL GLASS FABRIC LAYER

FIELD OF THE INVENTION

The invention relates generally to the field of building material products and, in particular, to insulated air ducts and methods for making the same.

BACKGROUND OF THE INVENTION

Ducts and conduits are used to convey air in building heating, ventilation and air conditioning (HVAC) systems. Often these ducts are formed of sheet metal and as a result do not possess good thermal or acoustical insulating properties. In order to enhance these insulation properties, sheet metal ducts are often insulated using mineral fiber insulation board which is installed around the metal ducts. The insulation board is often manufactured to include a facing material which acts as a vapor retarder/air barrier. Such facing material may be, for example, a FSK (foil/scrim/kraft) facing, a PSK (poly/scrim/kraft) facing, or an ASJ (all-service jacket) facing. In some applications, especially where the ducts or plenum will be subjected to outdoor exposure, a weather-resistant glass fabric and mastic coating is applied to the mineral fiber board insulation that has been installed onto the duct or plenum exterior.

Referring to FIG. 1, a prior art insulated duct 10 is shown having a rectangular duct 20, a mineral fiber insulation board 22, a facing material 24, a glass fabric 26 and a mastic coating 28.

The mineral fiber insulation board 22 is commonly composed of glass fibers bonded together with a thermosetting resin. The insulation board 22, is faced with a facing material 24, such as FSK (foil/scrim/kraft), PSK (poly/scrim/kraft) or ASJ (all-service jacket) to act as an air barrier/vapor retarder. A mastic coating 28 reinforced with a glass fabric or mesh 26 is applied to the facing material 24 to supply a weather barrier.

Typically, where a weather barrier is to be applied, a first coat of the mastic coating 28 is brushed, troweled or sprayed onto the facing material after the faced insulation board has been installed over the duct 20. The glass fabric 26, which is typically provided in the form of a roll, is cut to the proper dimensions and embedded into the first coat of the mastic coating 28. After embedding the glass fabric 26, a second coat of the mastic coating 28 is brushed, troweled or sprayed onto the glass fabric 26 to continuously cover the faced insulation board with the glass-reinforced mastic coating.

The process of having to cut and fit the glass fabric at the installation site is fairly labor-intensive and thus adds costs to the building project.

What is needed is an improved insulation product and method for installing the insulation product around ducts.

SUMMARY OF THE INVENTION

One aspect of the present invention is a method of insulating ducts including laminating a reinforcement fabric to a fibrous insulation board, lifting at least a portion of the reinforcement fabric from the fibrous insulation board, applying a first layer of a mastic coating to the fibrous insulation board, embedding the reinforcement fabric into the first layer of mastic coating, and applying a second layer of the mastic coating to the outside surface of the reinforcement fabric. The reinforcement fabric is laminated to the fibrous insulation board using an adhesive material.

Another aspect of the invention is an insulation product for installation around ducts including a fibrous insulation board and a reinforcement fabric laminated to the fibrous insulation board. The reinforcement fabric is laminated to the fibrous insulation board using an adhesive material.

A further aspect of the invention is an insulation product for installation around ducts including a fibrous insulation board, a facing material applied to the fibrous insulation board, and a reinforcement fabric laminated to the facing material. The reinforcement fabric is laminated to the facing material using an adhesive material.

DETAILED DESCRIPTION OF THE INVENTION

Figure 1:
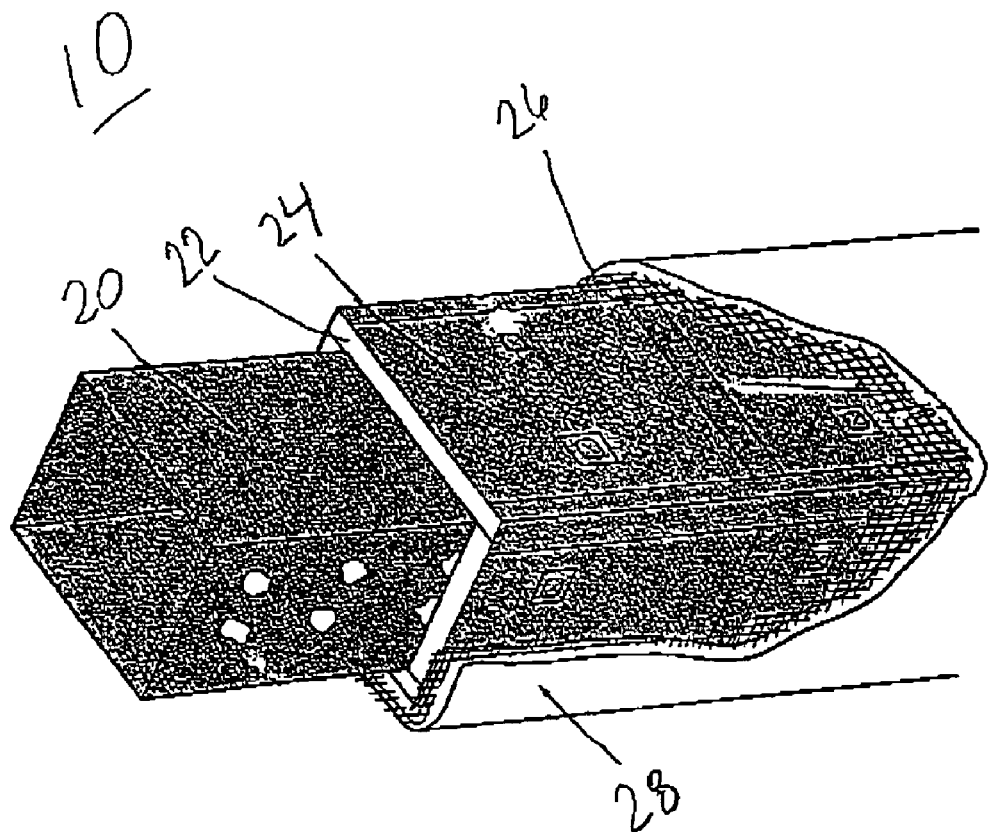
FIG. 1 is an isometric view of a prior art insulated duct.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2:
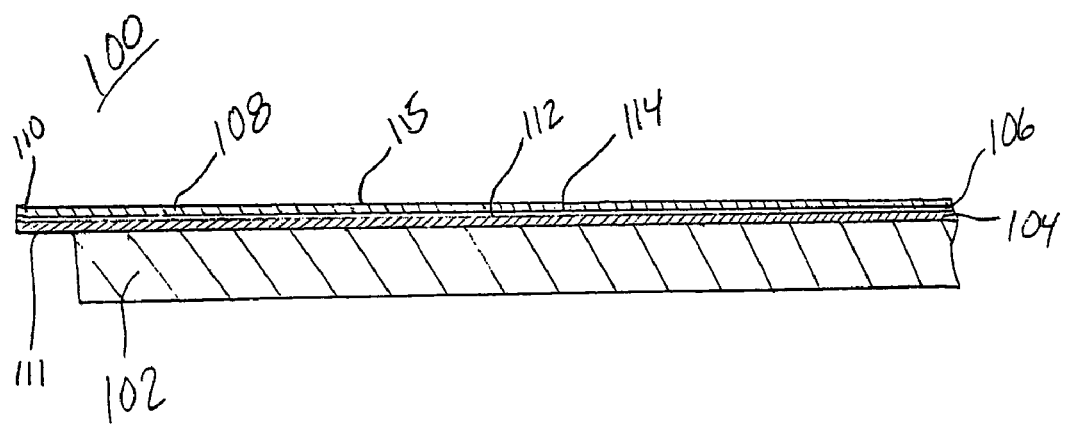
FIG. 2 is a cross-sectional view of an exemplary fibrous insulation product.

Referring to FIG. 2, a cross-sectional view of a fibrous insulation product 100 is shown comprising a fibrous insulation board 102, a facing material 104, an adhesive 106, and a reinforcement fabric 108. The figure is not drawn to scale, but rather some elements are exaggerated to better illustrate the product.

The fibrous insulation board 102 is preferably a mineral fiber insulation board comprised of mineral fibers such as glass fibers, rock wool fibers, slag fibers, alumina silica and basalt fibers resin bonded into a rigid or semi-rigid board. However, the fibrous insulation board 102 may be comprised of organic fibers, such as polyester, polypropylene or other polymeric fibers, or combinations thereof, for example. Although a fibrous insulation board is preferred, cellular insulation boards may also be used. The cellular material may be glass or foamed plastic, for example.

The facing material 104, which is generally factory-applied during manufacture of the fibrous insulation board, is preferably FSK, but may include any other suitable vapor retarder, such as ASJ (all-service jacket), or PSK (poly/scrim/kraft).

The adhesive 106 is preferably a removable adhesive, a permanent adhesive or a repositionable adhesive. The removable adhesive may be any suitable removable adhesive including water-based adhesives, hot melt glues, pressure sensitive adhesives, or heat-activated adhesives, including those sold by Henkel Adhesives Corporation of Elgin, Ill. and Bostik Findley of Wauwatosa, Wis. The removable adhesive may be in the form of a tape or a liquid, such as a spray or molten strip, for example. The removable adhesive may be applied in a substantially continuous coating, or may be applied intermittently, such as in the form of strips or dots, for example.

Suitable hot melt adhesives include, for example, Henkel product numbers 80-8669 and 80-8726 manufactured by Henkel Adhesives Corp. of Elgin, Ill. The hot melt adhesives are preferably applied in dots (or drops), as sprayed stripes, or as thin molten strips. Where applied in drops, preferably the drops are applied to the facing in rows of between approximately 3 to 6 inches apart. The drops are preferably spaced between approximately 3 to 6 inches apart, have a volume of approximately between 0.0005 to 0.005 cubic inches, more preferably about 0.002 cubic inches, and weigh approximately between about 0.007 to 0.075 gram/drop, and more preferably about 0.03 gram/drop. Where the hot melt is applied as sprayed stripes, preferably the stripes are approximately between ½ to 1 inch in width, and more preferably ¾ inch in width, and weigh between approximately 0.05 to 0.15 gram/lineal foot, and more preferably 0.1 gram/lineal foot. Preferably the sprayed stripes are spaced between approximately 3 to 6 inches on center of the facing. Where the hot melt adhesive is applied in thin molten strips, preferably the strips are placed between approximately 3 to 6 inches apart and have a weight of between about 0.05 to 0.15 gram/lineal foot, and more preferably about 0.1 gram/lineal foot.

Suitable waterbase adhesives include, for example, Henkel product numbers 42-5001 and 57-7001 (both vinyl acetate/acrylate blend with rubber based technology)), Henkel product number 57-6153M-2 (vinyl acetate/acrylate blend), and Henkel product number 57-0806 (vinyl acetate/acrylate emulsion). Preferably the waterbased adhesives are spray-applied in a dry weight of approximately between 0.05 to 0.15 gram/lineal foot, more preferably about 0.1 gram/lineal foot, in approximately between ½ to 1 inch wide strips, and more preferably ¾ inch wide strips, which are approximately 3 to 6 inches on center of the facing.

Where the adhesive 106 is a permanent adhesive, it is preferably applied in strips or dots, or in such other fashion that which uses a sufficiently small amount of adhesive to allow the reinforcement fabric to be readily removed from the facing material 104. The amount of adhesive required may be dependent, for example, on the type of facing material and/or mesh used.

Preferably the adhesive material is pre-coated onto the facing material in-line during the manufacture of the faced insulation board. Also, preferably, the adhesive material allows the reinforcement fabric 108 to be removed from the facing material 106, as discussed below, without damage to the facing material 106.

The reinforcement fabric or mesh 108 is preferably an open weave glass fabric or mesh. Although a glass fabric is preferred, the fabric may also be formed of polyester or nylon, for example. Further, other reinforcements fabrics may be used depending on the application and the type of mastic employed, including, for example, canvas, expanded metal lath, metal mesh and wire netting. Preferably the reinforcement fabric 108 has approximately 8 to 10 threads per inch in both warp and weft directions. Some preferred fabrics include, for example, Childers CHIL-GLAS® #10 Glass Fiber Reinforcing Mesh and Foster MAST-A-FAB® White Reinforcing Membrane polyester fabric manufactured by Foster Specialty Construction Brands, Inc. of Palatine, Ill., and Carolina Narrow Fabric Company glass fabric manufactured by Carolina Narrow Fabric Company of N.C. The reinforcement fabric 108 is adhered or laminated to an outside surface of the facing material 104 by the adhesive 106. The reinforcement fabric may have the same dimensions as the fibrous insulation board 102 or may be wider than the fibrous insulation board 102 to provide a tab 110 for overlapping a fibrous insulation product applied to an adjacent duct section. Facing material 104 may also be wider than the fibrous insulation board 102 to provide a tab 111 for likewise overlapping a fibrous insulation product applied to an adjacent duct section.

In forming the above described fibrous insulation product 100, a fibrous insulation board 102 is employed which may be produced by any known method. The fibrous insulation board may be, for example, CertaPro Commercial Board (e.g., CB300) manufactured by CertainTeed Corp. of Valley Forge, Pa. or Knauf Insulation Board manufactured by Knauf Insulation of Shelbyville, Ind. The fibrous insulation board 102 is preferably faced with the facing material 104 during an in-line process, again using known manufacturing processes.

Advantageously, unlike current techniques for forming and installing fibrous insulation boards around ducts, a reinforcement fabric 108 is further laminated to the facing material 104 of the fibrous insulation board 102. During the insulation board in-line manufacturing process, the fabric 108 may be laminated to the facing material 104 before, during or after lamination of the facing material 104 is applied to the insulation board 102. Preferably, however, the reinforcement fabric 108 is laminated to the facing material 104 prior to the lamination of the facing material 104 to the fibrous insulation board 102. Alternatively, the reinforcement fabric may be laminated to the facing material as an additional step at the end of the insulation board manufacturing process. As described above, the reinforcement fabric 108 is laminated or adhered to the facing material using an adhesive 106. Preferably, the adhesive 106 is applied to an outside surface 112 of the facing material 104, but may alternatively be applied to an inside surface of the reinforcement fabric 108. Depending, for example, on the type of adhesive, the adhesive 106 may be applied in strips or dots to an outside surface 112 of the facing material 104, such as by extruding, for example, or may substantially cover the outside surface 112, or some portion thereof, of the facing material 104 such as by roll-coating or spraying, for example. Where the adhesive 106 is applied to an inside surface of the reinforcement fabric 108, preferably the adhesive would be roll-coated onto the fabric 108. The lamination of the reinforcement fabric to the faced insulation board during the insulation board manufacturing process may reduce end-use installation labor costs by avoiding the requirement of sizing and cutting the reinforcement fabric at the installation site. By laminating the reinforcement fabric onto the faced insulation board during the manufacturing process, the reinforcement fabric is already sized to the proper dimensions.

Figure 3:
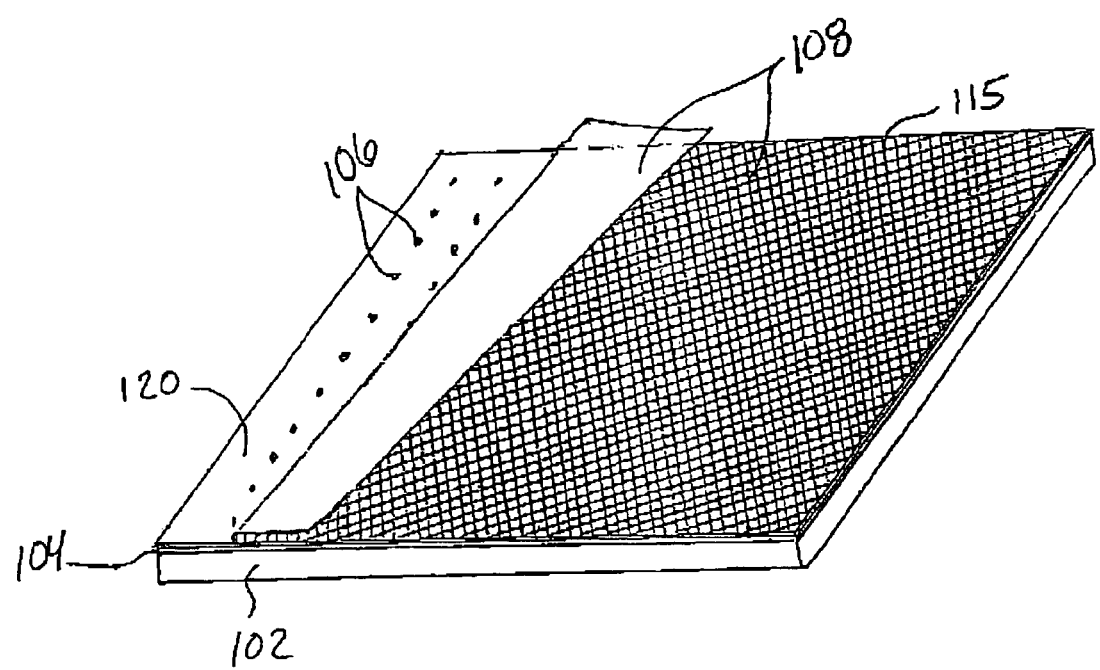
FIG. 3 is a top isometric view of a fibrous insulation product.

Referring to FIG. 3, a method of installing the above-described fibrous insulation product includes laminating or adhering a reinforcement fabric to the facing of a faced insulation board during manufacture of the board, installing the reinforcement fabric-laminated faced insulation board around a duct, lifting at least a portion of the reinforcement fabric from the faced fibrous insulation board, applying a first coat of a mastic coating to the facing material of the faced insulation board, embedding the reinforcement fabric into the first coat of the mastic coating, and applying a second coat of the mastic coating to the reinforcement fabric.

In installing the reinforcement fabric-laminated faced insulation board 100 around a duct, such as a metal HVAC duct, the insulation board 100 will be cut or grooved, using either hand tools or a grooving machine, to allow the board to be folded to conform to the shape of the duct. Either before, or preferably after, the insulation board 100 is installed around the duct, the reinforcement fabric 108, or a portion thereof, is lifted from the facing material 104 (or fibrous insulation board 102 if the board 100 is unfaced). The adhesive material 106 preferably allows the reinforcement fabric 108 to be readily removed from facing without damage to the facing material. In the embodiment shown in FIG. 3, the adhesive material 106 has been applied to the facing material 104 in the form of dots.

Once the reinforcement fabric 108 is lifted from the facing material, a first layer of mastic coating 120 can be applied to the facing material 104. The mastic coating may be, for example, Foster's VAPOR-FAS™ WB Coating #30-65, Foster's WEATHERITE™ Mastic #46-50, Childers AK-CRYL™ CP-9, Childers VI-CRYL™ CP-10 or CP-11, Childers CHIL-PERM® CP-30 Low Odor Vapor Barrier Coating, each manufactured by Foster Specialty Construction Brands, Inc. of Palatine, Ill., or Hy-Tech Thermal Solutions #RVBM-4 Vapor Barrier Mastic manufactured by Hy-Tech Thermal Solutions, LLC of Melbourne, Fla. The first layer of mastic is preferably applied to the facing at a rate of approximately 2 gallons/100 square feet (approximately 0.03 inch wet thickness). Once the first layer of mastic coating has been applied, the reinforcement fabric 108 is then embedded in the first layer of mastic coating. A second layer of mastic coating 120 may then be applied to outside surface 115 of the reinforcement fabric 108 to form a reinforced mastic coating. The second layer of mastic coating is preferably applied at a rate of 3 to 4 gallons/100 square feet (approximately 0.045 to 0.06 inch wet thickness).

The mastic coating may be any type suitable for the application. Preferably, the mastic coating is an emulsion or solvent type mastic coating, including a vinyl acrylic or asphaltic base mastic.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention. For example, although shown and described with reference to a square or rectangular-shaped duct, the fibrous insulation product can be produced and installed to fit around any shaped duct, including round, oval or irregularly shaped ducts. Further, the fibrous insulation product may be used to insulate other building elements, such as plenums, chillers and other equipment.

What is claimed is:

1. A method of insulating ducts comprising:
   laminating a reinforcement fabric to a fibrous insulation board using an adhesive material,
   lifting at least a portion of the reinforcement fabric from the fibrous insulation board,
   applying a first layer of a mastic coating to the fibrous insulation board,
   embedding the reinforcement fabric into the first layer of mastic coating, and
   applying a second layer of the mastic coating to the outside surface of the reinforcement fabric.

2. A method of insulating ducts comprising:
   providing a fibrous insulation board having a reinforcement fabric laminated thereto using an adhesive material,
   lifting at least a portion of the reinforcement fabric from the fibrous insulation board,
   applying a first layer of a mastic coating to the fibrous insulation board,
   embedding the reinforcement fabric into the first layer of mastic coating, and
   applying a second layer of the mastic coating to the outside surface of the reinforcement fabric.

3. The method of claim 2, wherein the laminating step is performed during manufacture of the fibrous insulation board.

4. The method of claim 2, wherein the fibrous insulation board is faced with a facing material and the reinforcement fabric is laminated to the facing material.

5. The method of claim 4, further comprising applying the faced fibrous insulation board to an exterior of a duct, wherein the step of applying the faced fibrous insulation board to the exterior of a duct is performed after laminating the reinforcement fabric to the faced fibrous insulation board.

6. The method of claim 4, wherein the reinforcement fabric is an open weave fabric comprised of glass, polyester, or nylon.

7. The method of claim 4, wherein the reinforcement fabric is laminated to the faced fibrous insulation board using a removable adhesive material.

8. The method of claim 4, wherein the adhesive material is pre-coated on the reinforcement fabric or the facing material.

9. The method of claim 4, wherein the adhesive material is applied between the facing material of the faced fibrous insulation board and the reinforcement fabric during the manufacturing process of the faced fibrous insulation board.

10. The method of claim 4, wherein the removable adhesive comprises a water-based adhesive, a hot melt glue, a pressure sensitive adhesive or a heat-activated adhesive.

11. The method of claim 4, wherein the reinforcement fabric is laminated to the faced fibrous insulation using a permanent adhesive material.

12. The method of claim 11, wherein the permanent adhesive material is applied intermittently between the facing material of the faced fibrous insulation board and the reinforcement fabric.

13. An insulation product made by the method of claim 1.

14. The insulation product of claim 13, wherein the reinforcement fabric is an open weave fabric comprised of glass, polyester or nylon.

15. The insulation product of claim 13, wherein the facing material is FSK, PSK or ASJ.

16. The insulation product of claim 13, wherein the adhesive material is a removable adhesive or a permanent adhesive.

17. The insulation product of claim 16, wherein the adhesive material is a water-based adhesive, a hot melt glue, a pressure sensitive adhesive or a heat-activated adhesive.

18. The insulation product of claim 13, wherein to reinforcement fabric is wider than to fibrous insulation board to form a tab capable of overlapping an adjacent fibrous insulation product.

19. The insulation product of claim 13 wherein the adhesive material is applied to the facing material or the reinforcement fabric in the form of strips, dots, or as a substantially continuous coating.

20. The insulation product of claim 13 wherein the adhesive material is applied to the facing material or the reinforcement fabric by spraying, roll coating or extruding.

21. The insulation product of claim 13, further comprising a facing material applied to the fibrous insulation board, wherein the reinforcement fabric is laminated to the facing material using an adhesive material.

\* \* \* \* \*